(12) United States Patent
Yang et al.

(10) Patent No.: US 10,071,640 B2
(45) Date of Patent: Sep. 11, 2018

(54) INTEGRATED MODULE OF ON-BOARD CHARGER AND INVERTER AND CONTROL METHOD THEREOF

(71) Applicant: HYUNDAI MOTOR COMPANY, Seoul (KR)

(72) Inventors: Jin Myeong Yang, Busan (KR); Si Hun Yang, Hwaseong-si (KR); Gyu Yeong Choe, Hwaseong-si (KR); Jin Young Yang, Hanam-si (KR); Han Geun Jang, Seoul (KR); Woo Young Lee, Yongin-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 12 days.

(21) Appl. No.: 15/355,519

(22) Filed: Nov. 18, 2016

(65) Prior Publication Data

US 2017/0349054 A1 Dec. 7, 2017

(30) Foreign Application Priority Data

Jun. 3, 2016 (KR) ........................ 10-2016-0069706

(51) Int. Cl.
*B60L 11/08* (2006.01)
*B60L 11/18* (2006.01)
(Continued)

(52) U.S. Cl.
CPC ........... *B60L 11/1814* (2013.01); *B60L 11/08* (2013.01); *H02M 7/1626* (2013.01); *H02M 7/44* (2013.01); *B60L 2210/40* (2013.01)

(58) Field of Classification Search
CPC ...... B60L 11/08; B60L 11/18; B60L 11/1814; B60L 2210/40; H02M 7/44
(Continued)

(56) References Cited

U.S. PATENT DOCUMENTS 7,443,049 B1 10/2008 Jones et al.
8,295,950 B1 * 10/2012 Wordsworth ...... B60H 1/00428
307/86
(Continued)

FOREIGN PATENT DOCUMENTS

JP H10-117441 A 5/1998
JP 2011-091898 A 5/2011
(Continued)

OTHER PUBLICATIONS

Korean Office Action issued in Application No. 10-2016-0069706 dated Sep. 15, 2017.
(Continued)

*Primary Examiner* — Atul Trivedi
(74) *Attorney, Agent, or Firm* — McDermott Will & Emery LLP

(57) ABSTRACT

An integrated module of an OBC and an inverter includes: an OBC primary side circuit and a plurality of transformers converting, when 3-phase alternating current (AC) voltages are received from a fuel station, the 3-phase AC voltages in form and level and transmitting the converted voltages into a secondary side; and an inverter switch turned off in a charge mode in which a high capacity vehicle battery is charged, to rectify an output voltage of a secondary side of each of the plurality of transformers by a body diode included in each switching element for an inverting function.

9 Claims, 5 Drawing Sheets

(51) Int. Cl.
    *H02M 7/44* (2006.01)
    *H02M 7/162* (2006.01)
(58) Field of Classification Search
    USPC .......................................................... 701/22
    See application file for complete search history.

(56) References Cited

U.S. PATENT DOCUMENTS

| | | | |
|---|---|---|---|
| 9,643,729 B2* | 5/2017 | Walter-Robinson | ........................ B64D 41/00 |
| 2007/0012492 A1* | 1/2007 | Deng | ........................ B60K 6/26 180/65.1 |
| 2011/0014501 A1* | 1/2011 | Scheucher | ................ B60K 1/04 429/7 |
| 2011/0080040 A1* | 4/2011 | Kumar | ...................... B60K 6/46 307/9.1 |
| 2013/0147431 A1* | 6/2013 | Lim | ........................ H02J 7/022 320/109 |
| 2014/0111121 A1* | 4/2014 | Wu | ........................ B60L 11/005 318/139 |
| 2014/0217973 A1* | 8/2014 | Lee | ..................... B60L 11/1812 320/109 |
| 2014/0217974 A1* | 8/2014 | Kim | .................... B60L 11/1812 320/109 |
| 2014/0312828 A1* | 10/2014 | Vo | ...................... H01M 10/4257 320/103 |
| 2015/0069834 A1 | 3/2015 | Jang et al. | |
| 2015/0069936 A1 | 3/2015 | Jang et al. | |
| 2015/0137751 A1* | 5/2015 | King | .................... B60L 11/1818 320/109 |
| 2016/0016479 A1* | 1/2016 | Khaligh | .............. B60L 11/1812 363/17 |
| 2016/0121741 A1 | 5/2016 | Kim | |
| 2017/0057650 A1* | 3/2017 | Walter-Robinson | ........................ B64D 41/00 |
| 2017/0327103 A1* | 11/2017 | Lim | ........................ H02J 7/022 |

FOREIGN PATENT DOCUMENTS

| | | |
|---|---|---|
| KR | 10-2014-0030458 A | 3/2014 |
| KR | 10-1409028 B1 | 6/2014 |
| KR | 2015-0029239 A | 3/2015 |
| KR | 10-1553747 B1 | 9/2015 |
| KR | 10-2016-0010158 A | 1/2016 |
| KR | 10-2016-0050953 A | 5/2016 |

OTHER PUBLICATIONS

Korean Office Action issued in Application No. 10-2016-0069706 dated Feb. 8, 2018, with English translation.

* cited by examiner

INTEGRATED MODULE OF ON-BOARD CHARGER AND INVERTER AND CONTROL METHOD THEREOF

CROSS-REFERENCE TO RELATED APPLICATION

This application is based on and claims the benefit of priority to Korean Patent Application No. 10-2016-0069706, filed on Jun. 3, 2016, in the Korean Intellectual Property Office, the disclosure of which is incorporated herein in its entirety by reference.

TECHNICAL FIELD

The present disclosure relates to an on-board charger (OBC) or an inverter, and more particularly, to an integrated module of an OBC and an inverter capable of reducing a size, and a control method thereof.

BACKGROUND

As the necessity for green vehicles (plug-in hybrid electric vehicles/electric vehicles (PHEV/EV)) has grown due to environment regulation in North America and Europe, PHEVs and EVs have come to prominence.

Consumers' most concern regarding green vehicles may be a per-charge driving range for long distance driving.

In order to increase a driving range, capacity of a high voltage battery is required to be increased, and even after capacity of such a high voltage battery is increased, an increase in capacity of a slow charging converter (or an on-board charger (OBC)) is required to be considered together with capacity of the high voltage battery in order to maintain a charge time prior to the in crease in capacity, to a degree. This is because consumers tend to be resistant to lengthening of a charge time to increase the per-charge driving range.

However, when capacity of the OBC is increased to two to four times, size and cost are inevitably increased proportionally.

SUMMARY

The present disclosure has been made to solve the above-mentioned problems occurring in the prior art while advantages achieved by the prior art are maintained intact.

An aspect of the present disclosure provides an integrated module of an on-board charger (OBC) and an inverter which can be integrated with each other as a body diode of an inverter switch is used as a rectifying diode of a high capacity OBC, and a control method thereof.

Embodiments in the present disclosure are not limited to the foregoing technical subjects and any other technical subjects not mentioned herein may be clearly understood by a person skilled in the art from the present disclosure described hereinafter.

According to an exemplary embodiment in the present disclosure, an integrated module of an on-board charger (OBC) and an inverter includes: an OBC primary side circuit and a plurality of transformers converting, when 3-phase alternating current (AC) voltages are received from a fuel station, each of the 3-phase AC voltages in form and level and transmitting each of the converted voltages into a secondary side; and an inverter switch turned off in a charge mode in which a high capacity vehicle battery is charged, to rectify an output voltage of a secondary side of each of the plurality of transformers by a body diode included in each switching element for an inverting function.

The inverter switch may be controlled to be turned on or off in an operation mode in which a vehicle drives, and convert a DC voltage from the high capacity vehicle battery into an AC voltage and supply the AC voltage to a vehicle driving motor.

The integrated module may further include: a plurality of second switches provided between an output of the inverter switch and the vehicle driving motor, controlled to be closed in the operation mode and controlled to be opened in the charge mode.

The integrated module may further include: a plurality of first switches provided between a plurality of nodes of the inverter switch receiving an output of a secondary side of each of the plurality of transformers and the output of the secondary side of each of the plurality of transformers, and controlled to be closed in the charge mode and controlled to be opened in the operation mode in which a vehicle drives.

According to another exemplary embodiment in the present disclosure, a method for controlling an integrated module of a charger and an inverter in which a body diode of an inverter switch is used as a rectifying diode of a high capacity on-board charger (OBC) by at least one processor, includes: determining whether a driving mode is an operation mode in which a vehicle is driving or a charge mode in which a high capacity vehicle battery is charged; and when the driving mode is the operation mode, configuring a path for the inverter switch to convert an output of the high capacity vehicle battery into an alternating current (AC) and supply the converted AC to a vehicle driving motor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Aforementioned subjects, advantages, and features of the present disclosure and implementation methods thereof will be clarified through following exemplary embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art, and the present disclosure is defined by the category of claims. The technical terms used in this disclosure are only used to explain a specific exemplary embodiment while not limiting the present disclosure. The terms of a singular form may include plural forms unless referred to the contrary. Further, it will be further understood that the terms "comprise" and/or "comprising," when used herein, specify the presence of stated features, steps, operations, elements, and/or components, but do not preclude the presence or addition of one or more other features, steps, operations, elements, components, and/or groups thereof.

Figure 1A:
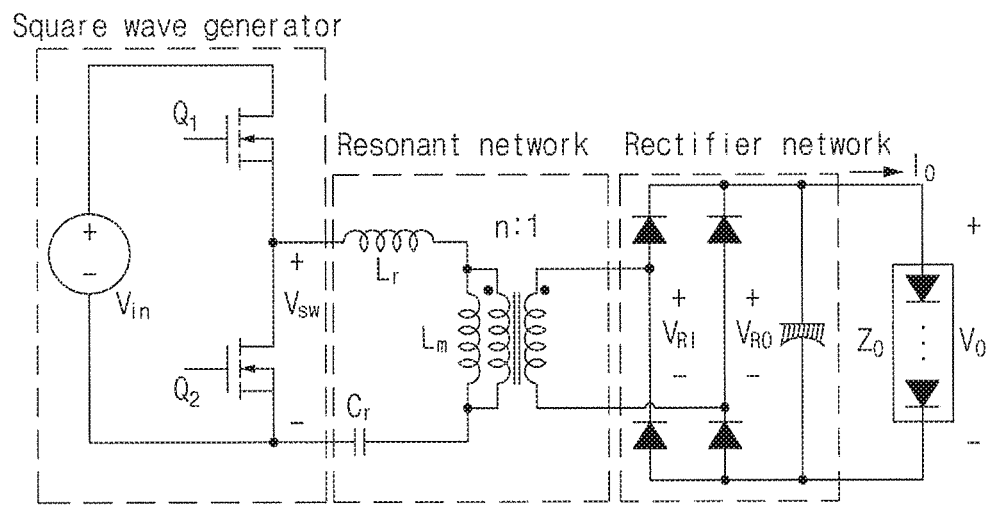
FIGS. 1A and 1B are views illustrating general high capacity chargers.
Figure 1B:
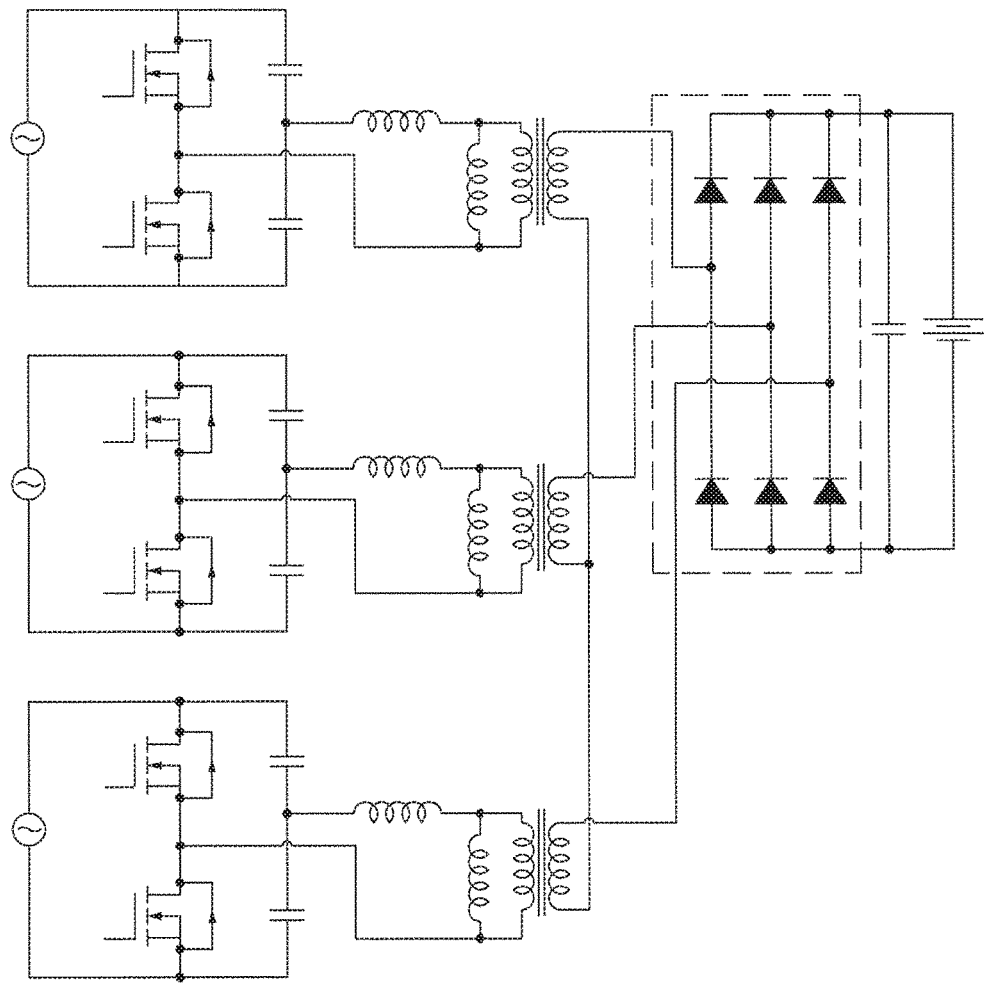

First, a configuration of a general high capacity charger and a general inverter will be described with reference to FIGS. 1A and 1B, before describing the present disclosure in detail. FIGS. 1A and 1B are views illustrating general high capacity chargers, and FIG. 1C is a view illustrating a general inverter circuit.

A basic circuit of a general high capacity on-board charger (OBC) is a half bridge inductor-inductor-capacitor (LLC) resonant converter as illustrated in FIG. 1A. However, in order to realize high capacity high speed charging, an actual circuit is a 3-phase circuit as illustrated in FIG. 1B.

Figure 1C:
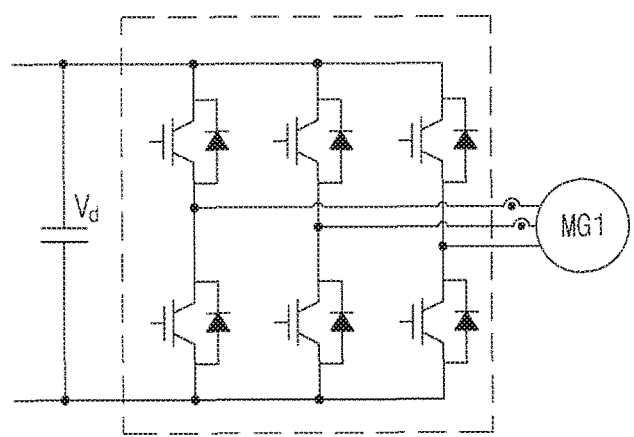
FIG. 1C is a view illustrating a general inverter circuit.

As illustrated in FIG. 1C, an inverter is basically configured as a 3-phase circuit, and a body diode-equipped insulated gate bipolar mode transistor (IGBT) is driven as a switch to convert a direct current (DC) into an alternating current (AC). The inverter converts a voltage from a high capacity battery into an AC and supplies the converted AC to a vehicle motor.

Here, the aforementioned OBC module and the inverter are driven in a driving state and a stop state of a vehicle, respectively, and thus, the two modules are never simultaneously driven. Thus, in the present disclosure, the OBC module and the inverter circuit of FIGS. 1B and 1C are integrally configured to reduce size and cost.

Figure 2A:
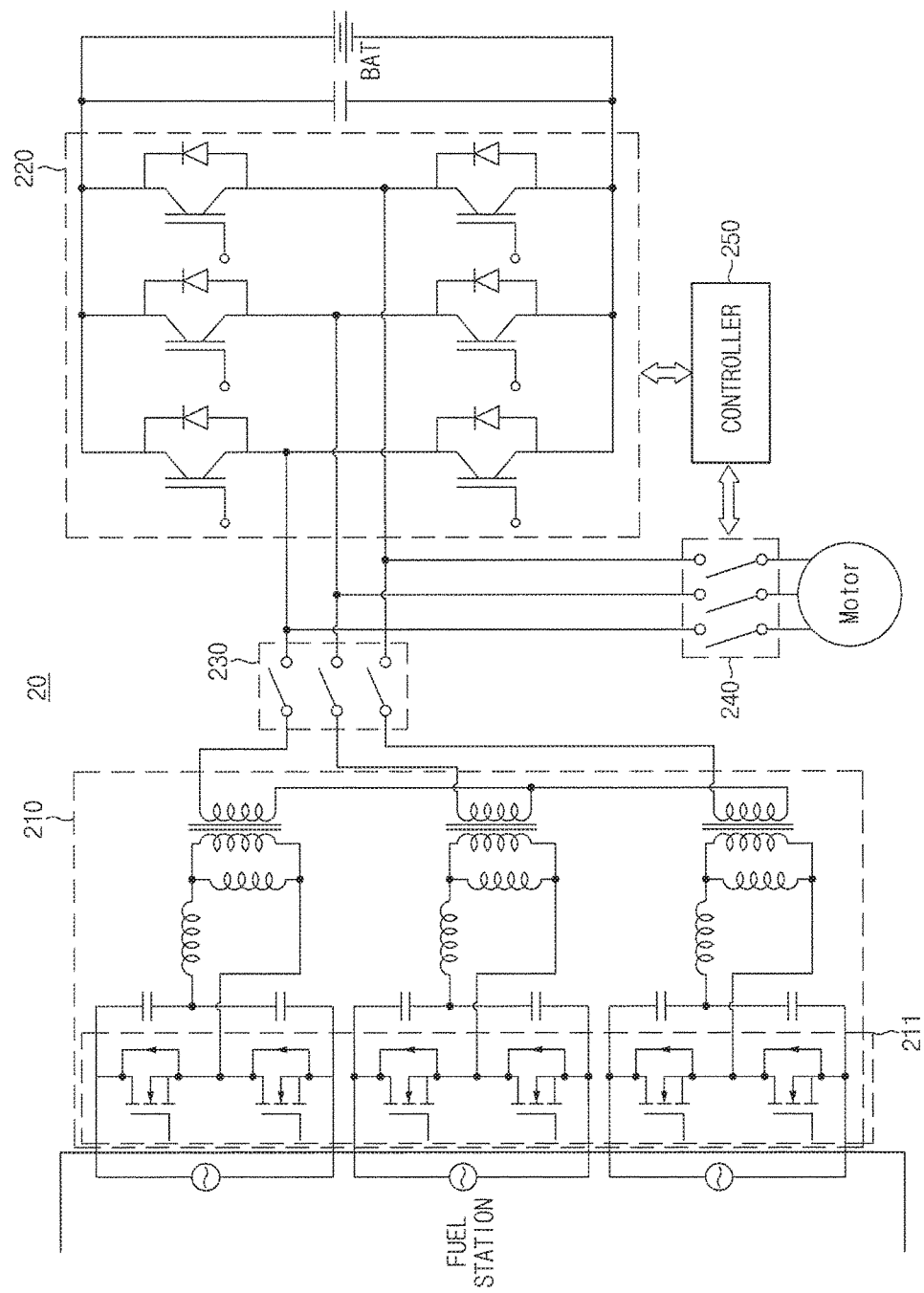
FIG. 2A is a circuit diagram of an integrated module of a high capacity on-board charger (OBC) and an inverter according to an exemplary embodiment in the present disclosure.
Figure 2B:
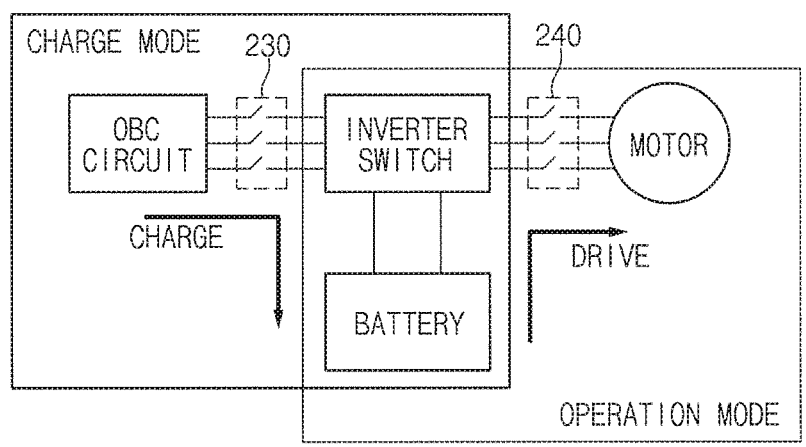
FIG. 2B is a conceptual view of an integrated module of a high capacity OBC and an inverter according to an exemplary embodiment in the present disclosure.

Hereinafter, an integrated module of a high capacity OBC and an inverter according to the present disclosure will be described with reference to FIGS. 2A and 2B. FIG. 2A is a circuit diagram of an integrated module of a high capacity OBC and an inverter according to an exemplary embodiment in the present disclosure, and FIG. 2B is a conceptual view of an integrated module of a high capacity OBC and an inverter according to an exemplary embodiment in the present disclosure.

As illustrated in FIG. 2A, an integrated module 20 of a high OBC and an inverter (or a high capacity OBC/inverter integrated module 20) according to the present disclosure includes an OBC circuit 210, first and second switch parts 230 and 240, a controller 250, and an inverter switch 220.

The OBC circuit 210 includes a primary side circuit of the 3-phase high capacity OBC circuit of FIG. 1B and a transformer. In a charge mode in which a high capacity battery BAT is charged, a primary side OBC switch part 211 of the transformer is turned on and off under the control of the controller 250.

The inverter switch 220 is turned off in the charge mode of the high capacity battery BAT and controlled to be turned on and off in an operation mode. The inverter switch 220 may be controlled by the controller 250.

Here, the inverter switch 220 may be an IGBT (please refer to the square dotted line of FIG. 1C) including a body diode applied to a general inverter. Alternatively, the inverter switch 220 may be any other switching element guaranteeing a high voltage input/output.

The inverter switch 220 may be in a default open state when not controlled to be turned on or off by the controller 250.

The first switch part 230 includes three switching elements respectively connected between outputs of first to third transformers corresponding to 3-phase AC voltages applied from a fuel station (three transformers included in the OBC circuit) and three-phase outputs of the inverter switch 220, and is controlled to be turned on and off by the controller 250.

The first switch part 230 is a circuit protective relay part, and in a case in which a node is not required to be opened when the OBC circuit 210 is not driven in terms of configuration of the OBC circuit 210, the first switch part 230 may be omitted.

The second switch part 240 includes three switching elements respectively connected between three-phase outputs of the inverter switch 220 and three-phase motor for driving a vehicle, and controlled to be turned on and off by the controller 250.

The second switch part 240 is a circuit protective relay part, and in a case in which a node is not required to be opened when a motor is not driven in terms of configuration of the motor circuit, the second switch part 240 may be omitted.

For example, in a case in which an inductor component within the motor is sufficiently large to prevent a current from flowing to the motor even when the inverter switch 220 is turned off, the second switch part 240 may be omitted.

The controller 250 checks a driving mode, and controls ON/OFF or closing/opening of the OBC switch part 211 of the OBC circuit 210, the inverter switch 220, the first switch part 230, and the second switch part 240 to correspond to the checked driving mode (charge mode or operation mode).

In detail, in the charge mode, the controller 250 controls the first switch part 230 to be closed, does not control an ON/OFF operation of the inverter switch 220, and controls an ON/OFF operation of the OGC switch part 211 for AC-DC conversion.

Accordingly, as illustrated in FIG. 2B, a 3-phase AC power applied from a fuel station is converted in level through the OBC circuit 210 and subsequently rectified by the body diode of the inverter switch 220, whereby the high capacity battery BAT can be charged. In this manner, in the present disclosure, since the body diode of a switching element applied to a general inverter is used as the rectifying diode (please refer to the rectangular dotted line of FIG. 1B) of the OBC, rectifying efficiency may be enhanced and heating may be reduced.

In the operation mode, the controller 250 controls the first switch part 230 to be opened and the second switch part 240 to be closed, and controls an ON/OFF operation of the inverter switch 220 for DC-AC conversion.

Accordingly, a DC voltage from the high capacity battery BAT is converted into an AC voltage by the inverter switch 220 and used for driving the motor as illustrated in FIG. 2B.

A process in which the controller 250 checks the driving mode may be the same as or similar to the inverter controlling or OBC controlling according to the related art.

For example, the controller 250 may switch the driving mode to the charge mode by detecting a signal from one node of the OBC circuit 211 to check whether power from a fuel station is transmitted. In detail, the controller 250 may switch the driving mode to the charge mode by sensing an output voltage of a secondary side of each of the first to third transformers.

Alternatively, when vehicle ignition ON is checked, the controller 250 may switch the driving mode to the charge mode.

Here, the controller 250 may check vehicle ignition ON through vehicle network communication.

The controller 250 may be a controller of a general OBC module, a controller of an inverter, or any other controller. Here, the controller 250 may include at least one processor or memory.

In the aforementioned embodiment, when the driving mode is neither the charge mode nor the operation mode, the controller 250 may control both the first and second switch parts 230 and 240 to be opened. Here, the controller 250 may control the OBC switch part 211 and the inverter switch 220 to be turned off.

As described above, according to the present disclosure, since the inverter switch and the OBC rectifying circuit are integrated and a switch sequence is adjusted, cost may be reduced, a weight of a single product may be reduced, and workability may be enhanced.

Further, according to the present disclosure, rectifying efficiency may be enhanced, heating may be reduced, and a reduction in weight may help increase in a driving distance.

In addition, according to the present disclosure, since OBC capacity is increased, a charge time may be reduced, an implementation area may be reduced through integration with an inverter, and manufacturing cost may be reduced.

Moreover, according to the present disclosure, workability of a worker who assembles an inverter and an OBC may be enhanced in manufacturing a vehicle.

Furthermore, according to exemplary embodiments of the present disclosure, an implementation size and an application area may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An integrated module of an on-board charger (OBC) and an inverter, the integrated module comprising:
   an OBC primary side circuit and a plurality of transformers converting, when 3-phase alternating current (AC) voltages are received from a fuel station, each of the 3-phase AC voltages in form and level and transmitting each of the converted voltages into a secondary side;
   an inverter switch turned off in a charge mode in which a high capacity vehicle battery is charged, to rectify an output voltage of the secondary side of each of the plurality of transformers by a body diode which is included in each switching element for an inverting function: and
   a plurality of first switches provided between a plurality of nodes of the inverter switch receiving an output of the secondary side of each of the plurality of transformers and the output of the secondary side of each of the plurality of transformers, the plurality of first switches controlled to be closed in the charge mode and controlled to be opened in an operation mode while a vehicle travels.

2. The integrated module according to claim 1, wherein the inverter switch is controlled to be turned on or off in the operation mode while the vehicle travels, and converts a DC voltage from the high capacity vehicle battery into an AC voltage and supplies the AC voltage to a vehicle driving motor.

3. The integrated module according to claim 2, further comprising:
   a plurality of second switches provided between an output of the inverter switch and the vehicle driving motor, controlled to be closed in the operation mode and controlled to be opened in the charge mode.

4. The integrated module according to claim 1, further comprising:
   a controller controlling ON/OFF of the plurality of switching elements included in the OBC primary side circuit and the inverter switch.

5. A method for controlling an integrated module of a charger and an inverter in which a body diode of an inverter switch is used as a rectifying diode of a high capacity on-board charger (OBC) by at least one processor, the method comprising:
   determining whether a driving mode is an operation mode in which a vehicle travels or a charge mode in which a high capacity vehicle battery is charged;
   configuring, when the driving mode is the operation mode, a path for the inverter switch to convert an output of the high capacity vehicle battery into an alternating current (AC) and supply the converted AC to a vehicle driving motor, and
   controlling a first switch provided between a plurality of nodes of the inverter switch, which respectively receive outputs of secondary sides of a plurality of transformers, and the secondary sides of the plurality of transformers, to be opened in the operation mode.

6. The method according to claim 5, further comprising:
   controlling, when the driving mode is the charge mode, ON/OFF of the inverter switch such that a 3-phase AC voltage from a fuel station passes through a high capacity OBC primary side circuit and a transformer, and is rectified by the rectifying diode.

7. The method according to claim 5, further comprising:
   controlling the first switch provided between the plurality of nodes of the inverter switch, which respectively receive outputs of the secondary sides of the plurality of transformers, and the secondary sides of the plurality of transformers, to be closed in the charge mode; and
   controlling a second switch provided between an output of the inverter switch and the vehicle driving motor, to be opened in the charge mode.

8. The method according to claim 5, further comprising:
   controlling a second switch provided between an output of the inverter switch and the vehicle driving motor, to be closed in the operation mode.

9. The method according to claim 5, wherein the step of determining includes:
   determining, when vehicle ignition ON is checked, that the driving mode is the operation mode; and
   determining, when it is detected that a 3-phase AC voltage is applied from a fuel station to the high capacity OBC, that the driving mode is the charge mode.

* * * * *